(12) United States Patent
Yang et al.

(10) Patent No.: US 11,559,942 B2
(45) Date of Patent: Jan. 24, 2023

(54) THREE-DIMENSIONAL OBJECT MOLDING METHOD AND MOLDING DEVICE

(71) Applicant: ZHUHAI SAILNER 3D TECHNOLOGY CO., LTD., Zhuhai (CN)

(72) Inventors: Qiancheng Yang, Zhuhai (CN); Wei Jiang, Zhuhai (CN)

(73) Assignee: ZHUHAI SAILNER 3D TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 17/243,474

(22) Filed: Apr. 28, 2021

(65) Prior Publication Data
US 2021/0245431 A1 Aug. 12, 2021

Related U.S. Application Data

(63) Continuation of application No. PCT/CN2020/083014, filed on Apr. 2, 2020.

(30) Foreign Application Priority Data

Apr. 18, 2019 (CN) .......................... 201910313416.1

(51) Int. Cl.
*B33Y 10/00* (2015.01)
*B33Y 30/00* (2015.01)
(Continued)

(52) U.S. Cl.
CPC .......... *B29C 64/153* (2017.08); *B29C 64/165* (2017.08); *B29C 64/209* (2017.08);
(Continued)

(58) Field of Classification Search
CPC ... B29C 64/165; B29C 64/205; B29C 64/295; B33Y 10/00; B33Y 30/00; B33Y 70/00
See application file for complete search history.

(56) References Cited

U.S. PATENT DOCUMENTS

2015/0259548 A1* 9/2015 Wang .................... B29C 64/106
428/339
2018/0001381 A1 1/2018 Kimblad
(Continued)

FOREIGN PATENT DOCUMENTS

CN 104647754 A 5/2015
CN 104908318 A 9/2015
(Continued)

OTHER PUBLICATIONS

International Search Report for PCT/cn2020/083014.
(Continued)

*Primary Examiner* — Mary Lynn F Theisen
(74) *Attorney, Agent, or Firm* — J.C. Patents (57) ABSTRACT

A three-dimensional object molding method and molding device, where the method includes the following steps: forming a powder particle layer, wherein the powder particle layer at least contains thermosetting powder particles capable of undergoing thermal polymerization; spraying a photocurable material onto the powder particle layer according to layer printing data, such that the photocurable material covers at least part of the powder particle layer and permeates into this layer; curing the photocurable material to form a slice layer; repeating the steps to obtain a plurality of slice layers, and stacking the plurality of slice layers layer-by-layer to form a three-dimensional object green body; and heating the green body to thermally polymerize the thermosetting powder particles so as to obtain the three-dimensional object. The method provided in the present application enables the obtained three-dimensional object to have very good mechanical properties and a high molding accuracy.

19 Claims, 2 Drawing Sheets

(51) Int. Cl.
  *B29C 64/295* (2017.01)
  *B29C 64/165* (2017.01)
  *B29C 64/153* (2017.01)
  *B33Y 70/00* (2020.01)
  *B29C 64/307* (2017.01)
  *B29C 64/245* (2017.01)
  *B29C 64/209* (2017.01)
  *B33Y 40/20* (2020.01)
  *B29K 63/00* (2006.01)
  *B29K 67/00* (2006.01)

(52) U.S. Cl.
  CPC .......... *B29C 64/245* (2017.08); *B29C 64/295* (2017.08); *B29C 64/307* (2017.08); *B33Y 10/00* (2014.12); *B33Y 30/00* (2014.12); *B33Y 40/20* (2020.01); *B33Y 70/00* (2014.12); *B29K 2063/00* (2013.01); *B29K 2067/06* (2013.01)

(56) References Cited

U.S. PATENT DOCUMENTS

2019/0248067 A1* 8/2019 Achten ................. B29C 64/393
2019/0263058 A1* 8/2019 Tuck ..................... B29C 64/165
2020/0055237 A1* 2/2020 Haidet .................. B29D 30/08

FOREIGN PATENT DOCUMENTS

| CN | 108381908 A | 8/2018 |
| CN | 109553726 A | 4/2019 |
| CN | 110065230 A | 7/2019 |
| EP | 2269808 B1 | 1/2011 |
| EP | 3372384 * | 9/2018 |
| EP | 3372384 A1 | 9/2018 |
| EP | 3375819 A1 | 9/2018 |
| EP | 3375820 A1 | 9/2018 |
| WO | WO2016020447 A1 | 2/2016 |
| WO | WO2018015554 A1 | 1/2018 |

OTHER PUBLICATIONS

First OA of the priority CN application.
Extended European Search Report of the parallel application EP20790433.5.
First Office Action of the parallel application JP2021-525764.

* cited by examiner

THREE-DIMENSIONAL OBJECT MOLDING METHOD AND MOLDING DEVICE

CROSS-REFERENCE TO RELATED APPLICATIONS

The present application is a continuation of International Application No. PCT/CN2020/083014, filed on Apr. 2, 2020, which claims priority to Chinese Patent Application No. 201910313416.1, filed on Apr. 18, 2019. The disclosures of the aforementioned applications are hereby incorporated by reference in their entireties.

TECHNICAL FIELD

The present application relates to the field of Three-Dimensional (3D) printing technology, in particular to a three-dimensional object molding method and molding device.

BACKGROUND 3D printing technology is also known as a Rapid Prototyping technology, a Rapid Prototyping Manufacturing technology, an Adding Manufacturing technology or the like. Its basic principle consists in slicing a 3D model based on slicing software, converting by a data processor the resulting slice data of a 3D model into layer printing data, and controlling by a controller a printing device to print layer-by-layer according to the layer printing data and stacking so as to form a 3D object. At present stage, the 3D printing technology mainly includes Selective Laser Sintering technology (abbreviated as: SLS technology), three Dimensional Inkjet Printing technology (belonging to: Multi-material Inkjet Printing technology, which is abbreviated as: MJP technology), etc.

SLS technology is also known as a powder three-dimensional molding technology. Its main process consists in spreading powder particle layers layer-by-layer on a supporting platform, and selectively layered-sintering the powder particles by laser according to model data, such that the powder particles are sintered or melted and then solidified into a slice layer, and stacking the resulting sintered slice layer layer-by-layer to form a three-dimensional object. In fact, the SLS technology relates to a physical molding process with low molding accuracy.

The materials used in the SLS technology may be metal powder, ceramic powder, plastic powder and so on. Plastics may generally be classified into thermosetting plastics and thermoplastics, where the thermosetting plastics refer to those that soften and flow after being heated, and no longer have plasticity and cannot be recycled when being heated again; thermoplastics are a type of plastics that is ductile at a certain temperature and cured after being cooled and can repeat such process. Therefore, the plastic powders used in the SLS technology are mostly thermoplastic powder particles. However, three-dimensional objects made from thermoplastic powder particles usually exhibit the defects of poor heat resistance and rigidity, which limit the application thereof in the fields of aerospace, automotive industry, chemical industry, textile industry and machinery manufacturing, and so on.

As for MJP technology, a controller controls a print head to selectively eject photocurable or thermosetting material on a supporting platform according to layer printing data, the material then forms a cured material layer through leveling and curing, and the above-mentioned cured material layer may be stacked layer-by-layer, thus forming a three-dimensional object. MJP technology actually relates to a chemical cross-linking molding process with high molding accuracy. However, in order to ensure the fluency of inkjet printing, the photocurable material or thermosetting material as a whole should have proper viscosity and surface tension or the like, thus imposing a certain restriction on the specific selection of material components, which makes the mechanical properties of the final three-dimensional object difficult to meet industrial applications.

SUMMARY

In view of the above-mentioned disadvantages, the present application provides a three-dimensional object molding method, such that the three-dimensional object can have good mechanical properties on the premise of high molding accuracy.

The present application also provides a three-dimensional object molding device for implementing the aforementioned three-dimensional object molding method.

In order to achieve the above objects, the present application provides a three-dimensional object molding method, including the following steps:

forming a powder particle layer, where the powder particle layer at least includes thermosetting powder particles capable of undergoing thermal polymerization;

spraying a photocurable material onto the powder particle layer according to layer printing data, such that the photocurable material covers at least part of the powder particle layer and permeates into the powder particle layer;

curing the photocurable material to form a slice layer;

repeating the above steps of forming the powder particle layer to forming the slice layer, to obtain a plurality of slice layers, and stacking the plurality of slice layers layer-by-layer to form a three-dimensional object green body; and heating the three-dimensional object green body to thermally polymerize the thermosetting powder particles so as to obtain a three-dimensional object.

Specifically, in an actual molding process of the three-dimensional object, a 3D model may be sliced first based on slicing software, a data processor converts the resulting slice data into layer printing data, a controller controls a three-dimensional inkjet printer to print the photocurable material on the surface of the powder particle layer according to the layer printing data, the photocurable material permeates into the powder particle layer, the gaps between the thermosetting powder particles are filled with the photocurable material, and the thermosetting powder particles are wrapped by the photocurable material. After photo-curing, a photosensitive resin in the photocurable material is cross-linked and cured to form a slice layer. The above steps are repeated and the resulting slice layers are stacked layer-by-layer so as to form the three-dimensional object green body. Finally, the three-dimensional object green body is heated to enable the thermosetting powder particles to be chemically cross-linked and cured, thus obtaining the three-dimensional object.

Therefore, the three-dimensional object molding method provided in the present application uses a thermosetting plastic as one of raw materials for the three-dimensional object, such that the resulting three-dimensional object not only retains the advantages of the thermosetting materials used in the three-dimensional inkjet printing technology, but also has unique and excellent properties of thermosetting plastic such as high temperature resistance, heat insulation, wear resistance, electric insulation and high pressure resistance, especially good mechanical properties, thereby broadening the application field of the three-dimensional printing technology.

Moreover, since the entire molding method makes full use of the three-dimensional inkjet printing technology, the molding accuracy of the three-dimensional object can be ensured. Furthermore, the photocurable material permeates into the powder particle layer and fills in the gaps between the powder particles, thus reducing the shrinkage of the thermosetting powder particles during heat treatment, and further improving the molding accuracy of the three-dimensional object.

The present application also provides a three-dimensional object molding device for implementing the aforementioned three-dimensional object molding method, comprising a powder supply part, a molding platform, an inkjet print head, a radiation source, and a heating part, where:

the powder supply part is configured to form said powder particle layer on the molding platform; the inkjet print head is configured to spray a photocurable material onto the powder particle layer according to layer printing data; the radiation source is configured to irradiate and cure the photocurable material to form a slice layer; and the heating part is configured to heat the three-dimensional object green body to thermally polymerize the thermosetting powder particles so as to obtain the three-dimensional object.

The three-dimensional object molding method provided in the present application consists in: firstly, using a thermosetting plastic to form a powder particle layer, and then spraying a photocurable material on the powder particle layer to enable the photocurable material to permeate into the gaps of the powder particle layer; and secondly, cross-linking and curing the photocurable material by photo-curing to wrap the powder particle layer to form a slice layer; stacking multiple slice layers obtained in the above manner layer-by-layer to obtain a three-dimensional object green body; and finally heating the three-dimensional object green body to thermally cure the thermosetting plastic, and thus obtaining the three-dimensional object.

Therefore, the three-dimensional object molding method provided by the present application subtly combines the SLS technology and the MJP technology and makes an improvement on them, making full use of the advantages of the MJP technology, and increasing the accuracy of the three-dimensional molding of powder particles. Furthermore, since the photocurable material is filled in the gaps of the powder particle layer, the shrinkage rate of the three-dimensional object after heat treatment may be reduced, thus further increasing the molding accuracy of the three-dimensional object.

In addition, by employing the thermosetting plastic as the raw material of the three-dimensional object, the present application enables the three-dimensional object to exhibit unique and excellent properties of thermosetting plastics such as high temperature resistance, heat insulation, wear resistance, electric insulation and high pressure resistance, especially good mechanical properties, while maintaining the inherent advantages of the photocurable material, such that the three-dimensional object may be widely applied to the fields of aerospace, automotive industry, chemical industry, textile industry and machinery manufacturing, and so on.

The three-dimensional object molding device provided in the present application can be used for implementing the aforementioned three-dimensional object molding method and obtain a three-dimensional object with high molding accuracy and mechanical strength.

DESCRIPTION OF REFERENCE NUMBERS

11—powder supply part;
12—molding platform;
13—inkjet print head;
14—leveling part;
15—heating part;
16—powder particle layer;
17—photocurable material;
18—slice layer;
19—three-dimensional object green body;
20—radiation source.

DESCRIPTION OF EMBODIMENTS

To make the objects, technical solutions, and advantages of embodiments of the present application more clear, the following clearly and comprehensively describes the technical solutions in embodiments of the present application with reference to the accompanying drawings in embodiments of the present application. Apparently, the described embodiments are merely part rather than all of embodiments of the present application. All other embodiments obtained by persons of ordinary skill in the art based on the embodiments of the present application without creative effort shall fall within the protection scope of the present application.

Embodiment 1

Figure 1:
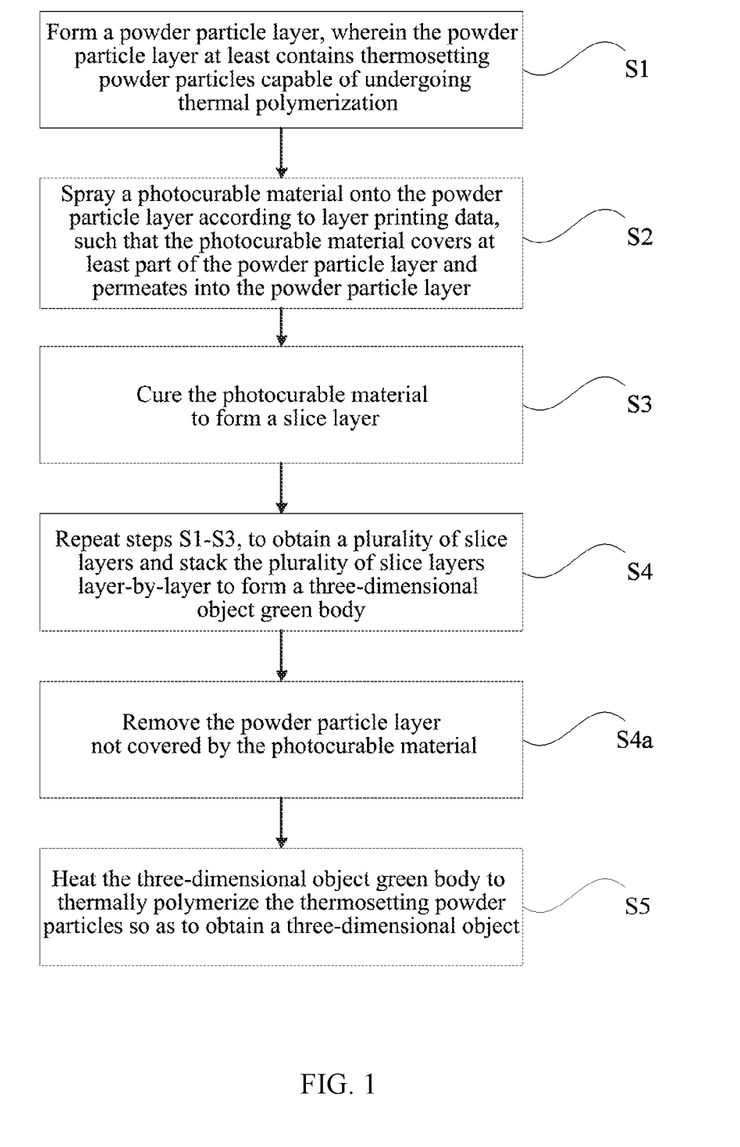
FIG. 1 is a schematic diagram of a three-dimensional object molding method provided in Embodiment 1 of the present application.

This embodiment provides a three-dimensional object molding method, as shown in FIG. 1, comprising the following steps:

S1. Forming a powder particle layer, where the powder particle layer at least contains thermosetting powder particles capable of undergoing thermal polymerization;

S2. Spraying a photocurable material onto the powder particle layer according to layer printing data, such that the photocurable material covers at least part of the powder particle layer and permeates into the powder particle layer;

S3. Curing the photocurable material to form a slice layer;

S4. Repeating the above steps of forming the powder particle layer to forming the slice layer (namely, steps S1 to S3), and stacking a plurality of the resulting slice layers layer-by-layer to form a three-dimensional object green body;

S5. Heating the three-dimensional object green body to thermally polymerize the thermosetting powder particles so as to obtain a three-dimensional object.

Specifically, an executive entity of the above three-dimensional object molding method may be a printing device, where the printing device implements the above steps S1 to S5 by controlling the supply-of-powder particle layer, inkjet printing, and heat treatment, and finally produces a target three-dimensional object.

The thermosetting powder particles used in the above step S1 is capable of undergoing thermal polymerization when being heated, that is, the molecules of the thermosetting powder particles can be crosslinked when being heated, and finally the thermosetting powder particles are cured and molded. The thermosetting powder particles have at least one reactive group capable of undergoing thermal polymerization in the molecular structures thereof.

The so-called reactive group capable of undergoing thermal polymerization refers to that the reactive groups on the thermosetting powder particles may undergo thermal polymerization reaction by themselves or with reactive groups on other thermosetting powder particles at a certain temperature.

For example, it may be that the thermosetting powder particles themselves have one reactive group capable of undergoing thermal polymerization; it may be that the thermosetting powder particles themselves have two or more reactive groups capable of undergoing thermal polymerization; or it may also be that two types of thermosetting powder particles are used, where each type of thermosetting powder particles has one reactive group, and the reactive groups on the two types of thermosetting powder particles may be thermally polymerized.

Specifically, the above reactive group may be at least one selected from the group consisting of epoxy group, cyanate group, isocyanate group, acid anhydride, carboxyl group, hydroxyl group, amino group, imino group, vinyl group, allyl group, and acryloxy group.

Optionally, the thermosetting powder particles are selected from at least one of epoxy resin, unsaturated polyester resin, saturated polyester resin, acrylic resin, acrylate resin, phenolic resin, cyanate resin, polyimide resin, bismaleimide resin, acid anhydride, solid polyacid, solid polyol, dicyandiamide, triglycidyl isocyanurate, β-hydroxyalkylamide, and dihydrazide.

Specifically, the epoxy resin may be selected from at least one of bisphenol A type epoxy resin, bisphenol S type epoxy resin, aldehyde epoxy resin, and tetraphenol ethane tetraglycidyl ether, etc.

Specifically, the unsaturated polyester resin may be selected from at least one of ortho-phthalic unsaturated polyester resin, para-phthalic unsaturated polyester resin, iso-phthalic unsaturated polyester resin, bisphenol A type unsaturated polyester resin, and vinyl ester type unsaturated polyester resin, etc.

Specifically, the saturated polyester resin may be selected from at least one of hydroxyl-terminated saturated polyester resin and carboxyl-terminated saturated polyester resin, etc.

Specifically, the acrylic resin may be selected from at least one of acrylic resin having epoxy group, acrylic resin having carboxyl group, and acrylic resin having hydroxyl group, etc.

Specifically, the acrylate resin may be selected from at least one of polyester acrylic resin, polyurethane acrylic resin, epoxy acrylic resin, and hyperbranched acrylic resin, etc.

Specifically, the phenolic resin may be selected from at least one of conventional phenolic resin, epoxy modified phenolic resin, poly(vinyl acetal) modified phenolic resin, polyamide modified phenolic resin, silicone modified phenolic resin, xylene modified phenolic resin, nano-powder modified phenolic resin, and metal/non-metal ion modified phenolic resin, etc.

Specifically, the cyanate resin may be selected from at least one of bisphenol A type cyanate resin, bisphenol F type cyanate resin, bisphenol M type cyanate resin, tetramethyl bisphenol F type cyanate resin, phenolic type cyanate resin, and dicyclopentadiene cyanate resin, etc.

Specifically, the polyimide resin may be selected from at least one of aliphatic polyimide resin, semi-aromatic polyimide resin, and aromatic polyimide resin, etc.

Specifically, the bismaleimide may be selected from at least one of aromatic bismaleimide, and modified aromatic bismaleimide, etc.

Specifically, the acid anhydride may be selected from at least one of maleic anhydride, pyromellitic dianhydride, o-phthalic anhydride, hexahydrophthalic anhydride, trimellitic anhydride, tetrachlorophthalic anhydride, and tetrabromophthalic anhydride, etc.

Specifically, the solid polyacid may be selected from at least one of terephthalic acid, isophthalic acid, adipic acid, fumaric acid, and 1,4-cyclohexanedicarboxylic acid, etc.

Specifically, the solid polyol may be selected from at least one of neopentyl glycol, dibromoneopentyl glycol, trimethylolpropane, hexanediol, and 1,4-cyclohexanedimethanol, etc.

It is not difficult to understand that the particle size of the thermosetting powder particles should not be too small, otherwise it will be hard for the photocurable material to permeate into the bottom of a current layer of the powder particle layers within short time, and it is also not conducive to the photo-curing and molding of the photocurable material; the particle size of the thermosetting powder particles should also not be too large, otherwise the gaps between the particles will be too large, which will affect the molding accuracy of the three-dimensional object. Therefore, in this embodiment, the diameter of the thermosetting powder particles is generally be controlled to 1 μm to 300 pin.

Besides the thermosetting powder particles, the powder particle layer may contain a catalyst for catalyzing the reactive group to undergo the thermal polymerization. This catalyst may be reasonably chosen according to the selected thermosetting powder particles, especially specific conditions of the reactive groups on the thermosetting powder particles.

Specifically, the catalyst may be selected from at least one of dodecylphenol, diaminodiphenylmethane, 1,3-diazacyclopentadiene, 2-methylimidazole, 2-ethylimidazole, 1-cyanoethyl-2-phenylimidazole, cobalt isooctanoate, stannous octoate, dibutyltin dilaurate, and p-toluenesulfonyl chloride, etc.

Optionally, the powder particle layer may also contain an initiator capable of decomposing into free radicals when being heated and then initiating a thermal polymerization reaction of the reactive group. A specific kind of the initiator may be reasonably chosen according to the specific conditions of the reactive group on the thermosetting powder particles, and include but not limited to at least one selected from the group consisting of benzoyl peroxide, dicumyl peroxide, cyclohexanone peroxide, potassium persulfate, ammonium persulfate, azobisisobutyronitrile, and azobisisoheptonitrile.

Optionally, the powder particle layer may also contain an accelerator for accelerating the decomposition of the initiator into free radicals, or accelerating the thermal polymerization of the reactive groups on the thermosetting powder particles.

Specifically, the aforementioned accelerator may be selected from at least one of tertiary amine and salts thereof, fatty amines, substituted urea, imidazole and salts thereof, metal salts of acetylacetone, triphenylphosphine and salts thereof, metal salts of carboxylic acid and complexes thereof, boron trifluoride amine complexes, phenols, quaternary ammonium salts, thiourea and derivatives thereof, organic guanidines, cycloalkylimidazoline, organic carboxylic salt, and titanic acid ester. For example, the accelerator may be selected from at least one of phenol, o-cresol, bisphenol A, resorcinol, ethylene thiourea, aliphatic amine, neodymium acetylacetonate, triphenylphosphine, and salicylic acid, etc.

The above catalyst, initiator, and accelerator all may cause the reactive groups on the thermosetting powder particles to rapidly undergo thermal polymerization reaction, reducing the heat treatment time, and thus shortening the manufacturing period of the three-dimensional object.

Optionally, the powder particle layer in this embodiment may further contain a filler to improve the performance of the powder particle layer after curing and molding, thereby enhancing the performance of the three-dimensional object.

The filler may be an inorganic filler or an organic filler, or it may contain both the inorganic filler and the organic filler. Among them, the inorganic filler includes at least one of calcium carbonate, barium sulfate, calcium sulfate, kaolin, asbestos, quartz powder, talc powder, mica powder, montmorillonite, aluminum powder, copper powder, zinc powder, iron powder, graphite, diamond, aluminum oxide, zirconium oxide, magnesium oxide, glass, ceramic, carbon, silicate, flue ash, borate, phosphate, silicon dioxide, titanium dioxide, and the like. The organic filler may be selected from at least one of carbon fiber, aramid fiber, thermoplastics such as polyethylene, polyvinyl chloride, polypropylene, polystyrene, ABS plastics, polycarbonate, polytetrafluoroethylene, polyethylene terephthalate, and modified plastics, etc.

Specifically, suitable fillers may be reasonably chosen according to actual performance requirements for the three-dimensional object. The filler may be mixed with other components, and then supplied to the powder supply part, and the powder particles are supplied layer-by-layer to form a powder particle layer with a target thickness.

In this embodiment, the thickness of the powder particle layer may be set reasonably according to the accuracy requirements of the actual target three-dimensional object. In addition, it should be ensured that the photocurable material can permeate into the bottom of a current layer of the powder particle layer. For example, it may be 15-400 µm.

Step S2 is selectively spraying at least one photocurable material onto the powder particle layer according to the layer printing data.

Specifically, in this embodiment, the method for obtaining layer printing data is not limited, and any method for obtaining layer printing data during the printing of a three-dimensional object in the art may be used. For example, the layer printing data may be obtained by slicing and layering a target three-dimensional object model with slicing software to obtain the layer image data, and then performing a color conversion and halftone processing on the layer image data with a data processor.

A specific volume of the photocurable material sprayed in the powder particle layer area per unit area is related to a cured state of the photocurable material. What needs to be met is that the photocurable material sprayed in the area per unit area can permeate into the bottom of a current layer of the powder particle layer, and meantime the photocurable material can be cured and molded.

The photocurable material described in this embodiment refers to a material that can undergo a curing reaction under the irradiation of a radiation source. The specific radiation source may be UV light, electromagnetic radiation, infrared ray, etc. The photocurable material used in this embodiment may specifically include a photocurable resin and/or monomer, a photoinitiator, and may also include an auxiliary agent.

There is no particular limitation on the photocurable resin in this embodiment, as long as it can undergo a photocuring reaction. Preferably, the photocurable resin may be at least one of (meth)acrylate oligomers having a nitrogen-containing heterocycle, such as BMA-200, XMA-222LF produced by Bomar company, etc.; and/or, at least one selected from (meth)acrylate oligomers having an aliphatic ring, such as aliphatic polyurethane acrylate, aliphatic epoxy acrylate, etc.; and/or, at least one selected from (meth)acrylate oligomers having an aromatic ring, such as bisphenol A (meth) epoxy acrylate, aromatic polyurethane (meth) acrylate, aromatic polyester (meth)acrylate, etc.; and/or, at least one selected from (meth)acrylate oligomers having a heterocyclic structure containing an oxygen (sulfur), such as oxane diacrylate, trimethylolpropane formaldehyde acrylate, etc.; and/or, at least one selected from epoxy resins that can undergo ring-opening reaction, such as poly(glycidyl ester), poly-(β-methylglycidyl)ester, poly(glycidyl ether), poly-(β-methylglycidyl)ether, etc.; and/or, at least one selected from (meth)acrylate oligomers without cyclic structure, such as polyether acrylate, polyester acrylate, hyperbranched acrylate oligomer, etc.

There is no particular limitation on the monomer in this embodiment, as long as it can participate in the photocuring reaction and play a role in adjusting the parameters and properties of the photocurable material. Specifically, it may be selected from at least one of amide monomers having a nitrogen-containing heterocycle, such as acryloylmorpholine (ACMO), N-vinylpyrrolidone, N-vinylcaprolactam, etc.; and/or, selected from at least one of the (meth)acrylate monomers having an aliphatic ring, for example, dicyclopentadiene methacrylate, dicyclopentane (methyl)acrylate, isobornyl (meth)acrylate, 1-adamantane (meth)acrylate, cyclohexane dimethanol diacrylate, tricyclodecane dimethanol di(meth)acrylate, etc.; and/or, selected from at least one of (meth)acrylate monomers having an aromatic ring, such as ethoxylated bisphenol A di(meth)acrylate, propoxylated bisphenol A di(meth)acrylate, benzyl methacrylate, 2-phenoxyethyl methacrylate, etc.; and/or, selected from at least one of (meth)acrylate monomers having a heterocyclic structure containing an oxygen (sulfur); and/or, selected from at least one of the (meth)acrylate monomers having a nitrogen-containing heterocycle, such as M370 produced by Gudi company, EM2308 produced by Changxing company, PAR-68A produced by Shenzhen SaBiSi company, A9300-1CL produced by Xinzhongcun company, etc.; and/or selected from at least one of (meth)acrylate monomers without a cyclic structure, such as 3-hydroxyl-2,2-dimethylpropyl-3-hydroxy-2,2-dimethylpropyl diacrylate, diethylene glycol diacrylate, dipropylene glycol diacrylate, etc.

The photoinitiator used in this embodiment may be at least one of a free radical photoinitiator and a cationic photoinitiator. Specifically, the free radical photoinitiator may be selected from at least one of α-hydroxy ketones, α-amino ketones, acyl phosphine oxides, oxime esters, ITX (isopropyl thioxanthone), tertiary amine benzoate, and active amine; the cationic photoinitiator may be selected from onium salts with weak nucleophilic anions, such as holanium salts, sulfonium salts, sulfonium oxide salts, iodoso salts, diazonium compound, etc.

The auxiliary agent used in this embodiment may be selected from at least one of surfactants, bubble-removing agents and polymerization inhibitors, and may also include other kinds of auxiliary agents.

There is no special limitation on the above-mentioned surfactants in this embodiment, as long as it can reduce the surface tension of the photocurable material and help improve the leveling property of the material. For example, the common surfactants in the market may be chosen, for example the modified polysiloxane polymer surfactants from BYK company, such as BYK-333, BYK-337, BYK-371, BYK-377, BYK1798, BYK-UV3530, and BYK-UV3575; and the modified polysiloxane polymer surfactants from Tego company, such as TEGO wet 270, TEGO wet 500, Tego Glide 450, TEGO RAD 2010, and TEGO RAD 2011.

The bubble-removing agent is mainly used to suppress or eliminate the bubbles generated during the preparation and printing of the photocurable material, so as to prevent the generated bubbles from affecting the fluency of the photocurable material in the course of printing. There is no specific limitation on the bubble-removing agent, and for example, the bubble-removing agent may be selected from those of silicone polymer type such as BYK-088 and BYK020, those of modified polysiloxane copolymer type such as BYK-1798, and those without silicone such as BYK055, from BYK company; or those of non-silicone type such as TEGO Airex 920 and TEGO Airex 921 from TEGO company.

The polymerization inhibitor is mainly used to prevent the polymerization of free radicals in the photocurable material, improve the storage stability of the photocurable material, and prevent the photocurable material from chemical reactions and coagulation. There is no specific limitation on the selection of the polymerization inhibitor in this embodiment, as long as it can improve the storage stability of the photocurable material and produce no effect on the photocuring reaction occurring during the 3D printing. Common polymerization inhibitor may be selected from GENORAD 16, GENORAD 18, GENORAD 20, and GENORAD 22 from Rahn AG; Tinuvin234, Tinuvin770, and Irganox245 from BASF; Cytec 5100 and Cytec 130 from Cytec; and Irgastab UV 10, and Irgastab UV 22 from Ciba.

According to the color requirements of the target three-dimensional object, the photocurable material in this embodiment may also include a colorant. The colorant may be at least one of a dye and a pigment, preferably a pigment, especially a self-dispersing nanoscale pigment paste. Since the surface of the self-dispersing nanoscale pigment paste is chemically modified, it is possible to prevent the pigment from flocculation and sedimentation, thereby ensuring the stability of the photocurable material.

In the specific implementation of this embodiment, the self-dispersing nanoscale pigment paste used may be a self-dispersing nanoscale inorganic pigment paste or a self-dispersing nanoscale organic pigment paste. Among them, the self-dispersing nanoscale inorganic pigment paste may specifically be a white pigment paste, such as titanium dioxide, zinc oxide, lithopone, white lead, etc.; it may also be a black pigment paste, such as carbon black, graphite, oxide iron black, aniline black, carbon black, etc. The self-dispersing nanoscale organic pigment paste may be colored pigment paste, such as Golden Red (PR21), Lithol Scarlet (PR49:1), Pigment Red G (PR37), Pigment Red 171 (PR171), Light Fast Yellow G (PY1), Hansa Yellow R (PY10), Permanent Yellow GR (PY13), Pigment Yellow 129 (PY129), Pigment Yellow 150 (PY150), Pigment Yellow 185 (PY185), Phthalocyanine Blue (PB15), Indanthrone (PB60), etc.

It should be particularly noted that in the course of molding a three-dimensional object in this embodiment, more than one type of photocurable material, such as photocurable materials with different colors, photocurable materials with different mechanical strengths, photocurable materials with different electrical properties, photocurable materials that may react chemically with each other, or any combination thereof, may be used.

Specifically, the type of photocurable materials sprayed onto the powder particle layer may be determined according to the requirements of the three-dimensional object. For example, if the three-dimensional object to be printed needs to contain two or more colors, the photocurable materials with at least two colors may be used. For example, if different parts of the three-dimensional object to be printed have different elastic properties, two types of photocurable materials that have different elastic properties after curing may be used. For example, if the different parts of the three-dimensional object to be printed have different conductive properties, multiple photocurable materials with different electrical properties may be used. If the photocurable material contains a substance that is readily for triggering the chemical reaction of the polymer, or in order to avoid the chemical reaction of the photocurable material before inkjet printing, two different photocurable materials are usually prepared and sprayed onto the powder particle layer via different dispensers, so that the two photocurable materials contact with each other on the powder particle layer and then the photo-curing reaction occurs.

In step S3, the photocurable material is cured and molded to form a slice layer.

The so-called curing refers to the use of a radiation source to irradiate the photocurable material so as to make the photocurable material undergo a photocuring reaction and then be in a solidified or semi-solidified state.

The radiation intensity of the radiation source is related to the photocuring reaction rate of the photocurable material, the travel rate of the radiation source, and the distance between the radiation source and the powder particle layer.

In this embodiment, the photocurable material is sprayed onto a current layer of the powder particle layer and penetrates into this current layer of the powder particle layer. When the photocurable material is cured, it wraps the powder particles and fills in the gaps between the powder particles, thereby forming a mixed layer of the photocurable material and powder particles, that is, forming a slice layer.

After one slice layer is formed according to the above steps S1, S2 and S3, the steps S1 to S3, that is, continuing to form a powder particle layer on a surface of the slice layer, spraying the photocurable material onto the current powder particle layer, and curing the photocurable material to form a new slice layer, are repeated. Multiple slice layers are stacked in sequence (printed and accumulated layer-by-layer in the height direction of the object) to form a three-dimensional object green body.

The outline of the three-dimensional object green body is substantially the same as the target three-dimensional object. Through further heating treatment, the thermosetting powder particles in the three-dimensional object green body are thermally polymerized, and finally the target three-dimensional object is obtained.

In this embodiment, the temperature for heating the three-dimensional object green body may be determined in the light of factors such as the thermal polymerization temperature of the thermosetting powder particles used and the volume of the three-dimensional object to be printed. Generally, the heating temperature may be controlled to 70-350° C.

Further, the three-dimensional object green body may be heated by a temperature-rise heating manner, such as a programmed temperature-rising manner. Adopting the temperature-rise heating manner is helpful for the reactive groups on the thermosetting powder particles, which are capable of initiating a thermal polymerization, to react slowly and sufficiently, thereby improving the performance of the three-dimensional object.

Furthermore, the three-dimensional object green body is heated by a stepped temperature-rise heating manner so as to further ensure the thermosetting powder particles to perform sufficient thermal polymerization. Specifically, the temperature-rise heating process may be divided into 2-15 stages, each stage including a former temperature-rise period and a later temperature-holding period. The temperature-rise rate of the temperature-rise period may be controlled to 0.5-30° C./min. The temperature of the temperature-holding period substantially remains constant and has a fluctuation range not more than 10° C., that is to say, the difference between the highest temperature and the lowest temperature in the temperature-holding period does not exceed 10° C. The heating time of each stage may be controlled to be within 0.5 to 10 hours, and the total heating time is 1 to 30 hours.

In this embodiment, the three-dimensional object green body is formed by selectively spraying the photocurable material onto the thermosetting powder particle layer by inkjet printing technology, photocuring to form the slice layer, and printing and stacking the slice layers layer-by-layer. This makes full use of the advantages of inkjet printing technology, enhancing the accuracy of the three-dimensional molding of powder particles. After that, the three-dimensional object green body is thermally treated to induce the thermosetting powder particles to undergo the chemical cross-linking reaction, and to finally obtain the target three-dimensional object. Compared with the existing thermoplastic powder particles, the thermosetting powder particles after the chemical cross-linking reaction have significantly improved mechanical properties. Therefore, the three-dimensional object molding method in this embodiment broadens the application field of the three-dimensional printing technology.

At the same time, in this embodiment, due to inevitable gaps between the powder particles, when the photocurable material is sprayed onto the powder particle layer, part of this photocurable material fills in such gaps, thereby reducing the shrinkage rate of the three-dimensional object after heat treatment and improving the molding accuracy of the three-dimensional object.

Embodiment 2

This embodiment provides a three-dimensional object molding method, which is further described on the basis of the Embodiment 1. For the parts not detailed in this embodiment, reference may be made to the description in the Embodiment 1.

Further referring to FIG. 1, in this embodiment, after the three-dimensional object green body is obtained, step S4a is executed, namely, the powder particle layer not covered by the photocurable material is removed.

As mentioned above, the area and shape of the photocurable material covering and permeating into the powder particle layer are determined by the layer printing data. The area of the powder particle layer should be at least not less than that of the photocurable material, so it is difficult to obviate that the powder particle layer is not covered and penetrated by the photocurable material. If this part of the powder particle layer that is not covered and penetrated is not removed, it will be cured and molded during subsequent thermal polymerization and then attached to the surface of the three-dimensional object. This will, on the one hand, increase the difficulty of post-processing and on the other hand, affect the accuracy of the target three-dimensional object since it is difficult to remove the attachment.

In view of the above situation, before heating the three-dimensional object green body, it will be better to remove the powder particle layer that is not covered and penetrated by the photocurable material and thus separate it from the three-dimensional object green body.

Specifically, the three-dimensional object green body may be separated from the powder particles that are not covered and penetrated by the photocurable material automatically, by mechanical automation, or separated by manual operation, without restriction on such separation, so that the finally obtained three-dimensional object green body contains no or substantially contains no powder particles that are not wrapped by the photocurable material.

Embodiment 3

Figure 2:
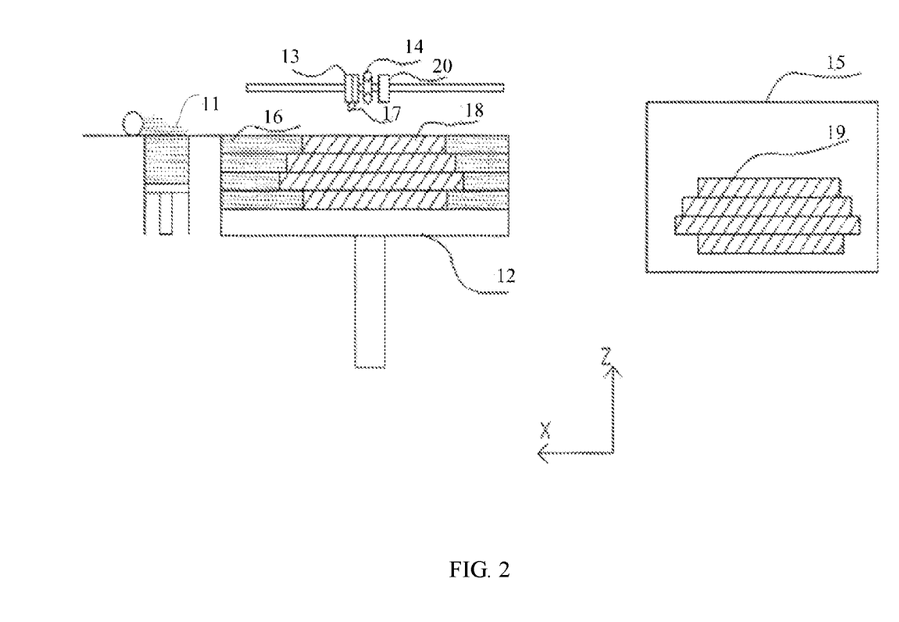
FIG. 2 is a schematic structural diagram of the three-dimensional object molding device provided in Embodiment 2 of the present application.

As shown in FIG. 2, this embodiment provides a three-dimensional object molding device, including a powder supply part 11, a molding platform 12, an inkjet print head 13, a radiation source 20, and a heating part 15, where:

the powder supply part 11 is configured to form the powder particle layer 16 on the molding platform 12;

the inkjet print head 13 is configured to spray a photocurable material 17 onto the powder particle layer 16 according to layer printing data;

the radiation source 20 is configured to irradiate the photocurable material 17 to cure the photocurable material 17 to form a slice layer 18;

the heating part 15 is configured to heat the three-dimensional object green body 19 to thermally polymerize thermosetting powder particles to obtain a three-dimensional object.

Specifically, a process of using the three-dimensional object molding device to print a three-dimensional object may be as follows:

the powder supply part 11 supplies powder particles to the molding platform 12 to form the powder particle layer 16;

after that, according to the layer printing data, the inkjet print head 13 selectively sprays the photocurable material 17 on the powder particle layer 16, and the photocurable material 17 covers and penetrates into the powder particle layer 16;

the photocurable material 17 in contact with the powder particle layer 16 is cured by radiation from the radiation source 20 to form a slice layer 18;

once one slice layer 18 or multiple slice layers 18 are formed, the molding platform 12 may be controlled to move downward by a distance of one or more layer thickness relative to the inkjet print head 13, and then continue to supply powder and perform inkjet printing for the next one layer or next several layers, such that the slice layers 18 are stacked in the Z direction as shown in FIG. 2, and finally a three-dimensional object green body 19 is obtained;

the three-dimensional object green body 19 is heated by the heating part 15 so as to thermally polymerize the thermosetting powder particles in the powder particle layer 16 to obtain a three-dimensional object.

In this embodiment, there is no special restriction on the structure of the above-mentioned powder supply part 11, as long as the powder particles can be supplied to the molding platform 12 to form the powder particle layer 16 with the required thickness on the molding platform 12. Certainly, the number of powder supply part 11 is not limited to one, as shown in FIG. 2, but may also be two or more, which may be placed on both sides of the molding platform 12 respectively.

In this embodiment, the molding platform 12 is configured to provide support for the printing of a three-dimensional object, and it may be a supporting platform used in an ordinary 3D printing process. Understandably, it would be better that the molding platform 12 is able to move up and down to facilitate printing.

In this embodiment, there is no special limitation on the type and specification of the inkjet print head 13, and it may be a print head with a single nozzle or multiple nozzles, and it may be a piezoelectric print head or a hot bubble print head. The number of the inkjet print head 13 may be determined according to the requirements of the three-dimensional objects to be printed.

In this embodiment, the type of the radiation source 20 is determined according to a curing formation of the photocurable material 17. For example, the photocurable material 17 can be cross-linked and cured under ultraviolet light irradiation, and then the radiation source 20 may be an LED ultraviolet lamp. Certainly, the radiation source 20 may also be an electromagnetic radiation source, an infrared radiation source, and so on.

In this embodiment, the heating part 15 is configured to provide enough heat to cause the thermosetting powder particles in the three-dimensional object green body 19 to undergo thermal polymerization. In a specific implementation, the heating part 15 is a heating furnace. The three-dimensional object green body 19 may be placed in the heating furnace for heating, and finally a three-dimensional object is obtained.

Further, the above-mentioned three-dimensional object molding device may also include a leveling part 14 such as a leveling roller, whose main function is to level the photocurable material 17 sprayed onto the powder particle layer 16, thus enhancing the accuracy of the slice layer 18, and ultimately improving the accuracy of the target three-dimensional object.

Further, the above-mentioned three-dimensional object molding device may also include a control part (not shown), which is configured to control the operation of at least one of the powder supply part 11, the inkjet print head 13, the radiation source 20, and the heating part 15.

For example, the control part may control the powder supply part 11 to supply powder particles to the molding platform 12 so as to form a powder particle layer 16 with a required thickness. For example, the control part may control the inkjet print head 13 to spray the photocurable material 17 onto the powder particle layer 16 according to the layer printing data. For example, the control part may control the radiation source 20 to irradiate the photocurable material 17 with appropriate radiation energy, so that the photocurable material 17 may be cured and molded. For example, the control part controls the heating part 15 to heat the three-dimensional object green body 19 at an appropriate heating rate and temperature, so that the thermosetting powder particles therein are thermally polymerized, cross-linked and molded.

Embodiment 4

This embodiment is an example of performing the molding of three-dimensional object with the three-dimensional object molding device of Embodiment 3 according to the three-dimensional object molding method of Embodiment 1 or 2, specifically including the following steps:

S1. First, the control part controls a single powder-supply part 11 to supply the powder particle layer 16 to the molding platform 12.

The powder particle layer 16 is specifically formed of thermosetting powder particles of cyanate resin, and the thickness of the powder particle layer 16 is about 20 μm.

S2. Then, the control part controls the inkjet print head 13 to selectively spray the photocurable material 17 onto the powder particle layer 16 according to the layer printing data.

The composition of the photocurable material 17 available in this embodiment is shown in Table 1 below. Table 1 provides formulations of four kinds of the photocurable materials in total, namely Composition 1 to Composition 4. In this embodiment, any one kind of the photocurable materials 17 may be used, or two, three or four kinds of photocurable materials 17 may be used in combination. Other compositions of the photocurable material 17 may also be selected, which will not be listed here.

It should be noted that in the Composition 1 to Composition 4 listed in Table 1, the photocurable material 17 without colorant is a colorless and transparent photocurable material, and a colorant may be added therein according to actual needs, and will not be repeated here.

S3. Subsequently, the photocurable material 17 is radiated by using a radiation source 20 such as a UV lamp, and the cured photocurable material 17 wraps the powder particles and fills in the gaps between the powder particles, thus forming a slice layer 18.

S4. The control part controls the molding platform 12 to move vertically downward by a distance of one layer thickness relative to the inkjet print head 13, and then the control part controls the powder supply part 11 to move upward by a certain distance to carry out the powder supply process of the next layer, the control part controls the inkjet print head 13 to perform inkjet printing of the current layer according to the layer printing data . . . finally, slice layers 18 are stacked along the Z direction in FIG. 2 to form a three-dimensional object green body 19.

S4a. Three-dimensional object green body 19 is separated from the unwrapped thermosetting powder particles by manual operation, and is rinsed with liquid.

S5. The three-dimensional object green body 19 is placed in a heating furnace in a programmed temperature-rising mode, which is divided into two stages in total: a first stage, where the heating rate is about 15° C./min, the temperature is controlled to about 200-210° C., and the heating time is about 5 hours, and the main function of this stage is to uniformly heat the whole three-dimensional object green body 19, and heat the thermosetting powder particles such that the reactive groups begin to undergo thermal polymerization; a second stage, where the heating rate is about 10° C./min, the temperature is controlled to about 310-320° C., and the heating time is about 10 hours, and the main function of this stage is to induce the reactive groups on the thermosetting powder particles to further cross-link and polymerize, and complete the reaction, and finally obtain a high-performance three-dimensional object.

TABLE 1

Composition of the photocurable material

| Component | Compound/Trade Name | Composition 1 | Composition 2 | Composition 3 | Composition 4 |
|---|---|---|---|---|---|
| Photocurable resin | Aliphatic epoxy acrylate | ✓ | | | |
| | Aromatic polyurethane acrylate | | | | ✓ |
| | Polyester acrylate | | ✓ | | |
| | Bisphenol A epoxy acrylate | | | ✓ | |
| Monomer | Acryloyl morpholine | ✓ | ✓ | ✓ | ✓ |
| | isobornyl acrylate | ✓ | | ✓ | ✓ |
| | Diethylene glycol diacrylate | ✓ | ✓ | | ✓ |
| | 3-hydroxy-2,2-dimethyl-propyl-3-hydroxy-2,2-dimethylpropyl diacrylate | ✓ | ✓ | | |
| | 2-phenoxyethyl methacrylate | | | | ✓ |
| | Ethoxylated bisphenol A dimethacrylate | | | | ✓ |
| Photoinitiator | Acyl phosphine oxide | ✓ | ✓ | ✓ | |
| | ITX | | | | ✓ |
| | α-hydroxy ketones | | ✓ | | ✓ |
| Auxiliary agent | GENORAD 20 (Polymerization inhibitor) | ✓ | ✓ | ✓ | |
| | GENORAD 22 (Polymerization inhibitor) | | | | ✓ |
| | BYK333 (Surfactant) | ✓ | ✓ | | ✓ |
| | TEGO wet 500 (Surfactant) | | | ✓ | |
| | TEGO Airex 920 (Bubble-removing agent) | ✓ | | ✓ | |
| Colorant | Pigment Yellow 185 | ✓ | | | |
| | Pigment Red G | | | ✓ | |
| | Titanium dioxide | | | | ✓ |

Embodiment 5

This embodiment is an example of performing the molding of three-dimensional object with the three-dimensional object molding device of Embodiment 3 according to the three-dimensional object molding method of Embodiment 1 or 2. The specific steps are similar to those in Embodiment 4, except that:

In step S1, the powder particle layer 16 in this embodiment contains dibutyltin dilaurate catalyst besides the thermosetting powder particle of cyanate resin. That is to say, the powder particles are a mixture of cyanate resin and dibutyltin dilaurate.

In step S2, after the photocurable material 17 is sprayed, a leveling roller is used to level the sprayed photocurable material 17.

Step S5: The three-dimensional object green body 19 is placed in a heating furnace in an inert environment and heated in a programmed temperature-rising mode, which is divided into three stages in total: a first stage where the heating rate is about 5° C./min, the temperature is controlled to about 110-120° C., and the heating time is about 3 hours, and the main function of this stage is to uniformly heat the whole three-dimensional object green body 19 and heat the thermosetting powder particles, such that the reactive groups begin to undergo thermal polymerization; a second stage, where the heating rate is about 3° C./min, the temperature is controlled to about 150-160° C., and the heating time is about 2 hours, and the main function of this stage is to accelerate the reactive groups on the thermosetting powder particles to cross-link and polymerize, and complete at least 50% of the polymerization; and a third stage, where the heating rate is about 1° C./min, the temperature is controlled to about 210-220° C., and the heating time is about 2 hours, and the main function of this stage is to further promote the complete cross-linking polymerization reaction of the reactive groups on the thermosetting powder particles and thoroughly complete the reaction, and finally obtain a three-dimensional object with high performance.

In this embodiment, a catalyst is used to catalyze the cross-linking reaction of the reactive groups on the thermosetting powder particles, which may accelerate the cross-linking reaction rate and shorten the molding period of the three-dimensional object. Moreover, in this embodiment, the number of stages in the programmed temperature-rising process is increased and the temperature change in different stages is gradiently reduced, such that the uniformity and thoroughness of the thermosetting reaction in the three-dimensional object green body may be improved, and the performance uniformity of each part of the manufactured three-dimensional object may be enhanced.

Embodiment 6

Except that the powder particle layer 16 is a mixture of thermosetting powder particle of cyanate resin, the dibutyltin dilaurate catalyst and silica filler, the others are the same as those in Embodiment 5. The three-dimensional object produced therefrom has higher mechanical properties than the three-dimensional object manufactured in Embodiment 5.

Embodiment 7

This embodiment is an example of performing the molding of three-dimensional object with the three-dimensional object molding device of Embodiment 3 according to the three-dimensional object molding method of Embodiment 1 or 2. The specific steps are similar to those in Embodiment 4, except that:

in step S1, the powder particle layer 16 of this embodiment includes thermosetting powder particle of unsaturated polyester and dicumyl peroxide initiator;

in step S2, after the photocurable material 17 is sprayed, a leveling roller is used to level the sprayed photocurable material 17; and Step S5: the three-dimensional object green body 19 is placed in a heating furnace in an inert environment and heated in a programmed temperature-rising mode, which is divided into two stages in total: a first stage, where the heating rate is about 1° C./min, the temperature is controlled to about 120-130° C., and the heating time is about 2 hours, and the main function of this stage is to uniformly heat the whole three-dimensional object green body 19 and heat the thermosetting powder particles, such that the reactive groups begin to undergo thermal polymerization; and a second stage, where the heating rate is about 2° C./min, the temperature is controlled to about 150-160° C., and the heating time is about 5 hours, and the main function of this stage is to promote the cross-linking polymerization reaction of the reactive groups on the thermosetting powder particles and complete such reaction, and finally obtain a three-dimensional object with high performance.

Finally, it should be noted that the foregoing embodiments are merely intended to describe the technical solutions of the present application rather than to limit them. Although the present application is described in detail with reference to the foregoing embodiments, persons of ordinary skill in the art should understand that they may still make modifications to the technical solutions described in the foregoing embodiments or make equivalent substitutions to some or all technical features therein, and these modifications or substitutions will not make the essence of corresponding technical solutions depart from scope of the technical solutions of embodiments of the present application.

What is claimed is:

1. A three-dimensional object molding method, comprising:
    forming a powder particle layer, wherein the powder particle layer at least comprises thermosetting powder particles capable of undergoing thermal polymerization;
    spraying a photocurable material onto the powder particle layer according to layer printing data, such that the photocurable material covers at least part of the powder particle layer and permeates into the powder particle layer;
    photocuring the photocurable material, such that the photocurable material is cross-linked and cured to wrap the thermosetting powder particles of the powder particle layer and fill gaps between the thermosetting powder particles to form a slice layer;
    repeating the above steps of forming the powder particle layer to forming the slice layer, to obtain a plurality of slice layers, and stacking the plurality of slice layers layer-by-layer to form a three-dimensional object green body; and
    heating the three-dimensional object green body to thermally polymerize the thermosetting powder particles, such that the thermosetting powder particles are cured to obtain the three-dimensional object.

2. The three-dimensional object molding method according to claim 1, wherein before heating the three-dimensional object green body, the method further comprises removing the powder particle layer that is not covered by the photocurable material.

3. The three-dimensional object molding method according to claim 1, wherein the thermosetting powder particles have a particle size of 1-300 μm, and/or, the powder particle layer has a thickness of 15-400 μm.

4. The three-dimensional object molding method according to claim 1, wherein the thermosetting powder particles have at least one reactive group capable of undergoing thermal polymerization in molecular structure thereof, the reactive group capable of undergoing thermal polymerization comprises at least one of epoxy group, cyanate group, isocyanate group, acid anhydride, carboxyl group, hydroxyl group, amino group, imine group, vinyl group, allyl group, and acryloxy group.

5. The three-dimensional object molding method according to claim 1, wherein the thermosetting powder particles are selected from at least one of epoxy resin, unsaturated polyester resin, saturated polyester resin, acrylic resin, acrylate resin, phenolic resin, cyanate resin, polyimide resin, bismaleimide, acid anhydride, solid polyacid, solid polyol, dicyandiamide, triglycidyl isocyanurate, β-hydroxyalkylamide, and dihydrazide.

6. The three-dimensional object molding method according to claim 5, wherein the epoxy resin is selected from at least one of bisphenol A type epoxy resin, bisphenol S type epoxy resin, aldehyde epoxy resin, and tetraphenol ethane tetraglycidyl ether;
    the unsaturated polyester resin is selected from at least one of ortho-phthalic unsaturated polyester resin, para-phthalic unsaturated polyester resin, iso-phthalic unsaturated polyester resin, bisphenol A type unsaturated polyester resin, and vinyl ester type unsaturated polyester resin;
    the saturated polyester resin is selected from at least one of hydroxyl-terminated saturated polyester resin and carboxyl-terminated saturated polyester resin;
    the acrylic resin is selected from at least one of acrylic resin having epoxy group, acrylic resin having carboxyl group, and acrylic resin having hydroxyl group;
    the acrylate resin is selected from at least one of polyester acrylic resin, polyurethane acrylic resin, epoxy acrylic resin, and hyperbranched acrylic resin;
    the phenolic resin is selected from at least one of conventional phenolic resin, epoxy modified phenolic resin, poly(vinyl acetal) modified phenolic resin, polyamide modified phenolic resin, silicone modified phenolic resin, xylene modified phenolic resin, nano-powder modified phenolic resin, metal modified phenolic resin and non-metal ion modified phenolic resin;
    the cyanate resin is selected from at least one of bisphenol A type cyanate resin, bisphenol F type cyanate resin, bisphenol M type cyanate resin, tetramethyl bisphenol F type cyanate resin, phenolic type cyanate resin, and dicyclopentadiene cyanate resin;

the polyimide resin is selected from at least one of aliphatic polyimide resin, semi-aromatic polyimide resin, and aromatic polyimide resin;

the bismaleimide is selected from at least of aromatic bismaleimide and modified aromatic bismaleimide;

the acid anhydride is selected from at least one of maleic anhydride, pyromellitic dianhydride, o-phthalic anhydride, hexahydrophthalic anhydride, trimellitic anhydride, tetrachlorophthalic anhydride, and tetrabromophthalic anhydride;

the solid polyacid is selected from at least one of terephthalic acid, isophthalic acid, adipic acid, fumaric acid, and 1,4-cyclohexanedicarboxylic acid;

the solid polyol is at selected from least one of neopentyl glycol, dibromoneopentyl glycol, trimethylolpropane, hexanediol, and 1,4-cyclohexanedimethanol.

7. The three-dimensional object molding method according to claim 1, wherein the powder particle layer further comprises at least one of following components:

a catalyst for catalyzing the thermosetting powder particles to undergo the thermal polymerization;

an initiator for initiating the thermosetting powder particles to undergo the thermal polymerization when being heated;

an accelerator for accelerating the thermal polymerization of the thermosetting powder particles; and a filler.

8. The three-dimensional object molding method according to claim 7, wherein the catalyst is selected from at least one of dodecylphenol, diaminodiphenylmethane, 1,3-diazacyclopentadiene, 2-methylimidazole, 2-ethylimidazole, 1-cyanoethyl-2-phenylimidazole, cobalt isooctanoate, stannous octoate, dibutyltin dilaurate, and p-toluenesulfonyl chloride.

9. The three-dimensional object molding method according to claim 7, wherein the initiator is selected from at least one of benzoyl peroxide, dicumyl peroxide, cyclohexanone peroxide, potassium persulfate, ammonium persulfate, azobisisobutyronitrile, and azobisisoheptonitrile.

10. The three-dimensional object molding method according to claim 7, wherein the accelerator is selected from at least one of tertiary amine and salts thereof, fatty amines, substituted urea, imidazole and salts thereof, metal salts of acetylacetone, triphenylphosphine and salts thereof, metal salts of carboxylic acid and complexes thereof, boron trifluoride amine complexes, phenols, quaternary ammonium salts, thiourea and derivatives thereof, organic guanidines, cycloalkylimidazoline, organic carboxylic salt, and titanic acid ester.

11. The three-dimensional object molding method according to claim 10, wherein the accelerator is selected from at least one of phenol, o-cresol, bisphenol A, resorcinol, ethylene thiourea, aliphatic amine, neodymium acetylacetonate, triphenylphosphine, and salicylic acid.

12. The three-dimensional object molding method according to claim 1, wherein a temperature for heating is 70-350° C.

13. The three-dimensional object molding method according to claim 12, wherein the three-dimensional object green body is heated by a temperature-rise heating manner.

14. The three-dimensional object molding method according to claim 13, wherein the temperature-rise heating is divided into 2-15 stages, each stage including a former temperature-rise period and a later temperature-holding period, wherein a temperature-rise rate of the temperature-rise period is 0.5-30° C./min; the temperature-holding period has a temperature fluctuation range not more than 10° C.;

each stage has a heating time within 0.5 to 10 hours; and a total heating time is 1 to 30 hours.

15. The three-dimensional object molding method according to claim 1, wherein the photocurable material at least comprises at least one of a photocurable resin and monomer, and a photoinitiator.

16. The three-dimensional object molding method according to claim 15, wherein the photocurable material further comprises at least one of a colorant and an auxiliary agent.

17. A three-dimensional object molding device, for implementing the aforementioned three-dimensional object molding method according to claim 1, at least comprising a powder supply part, a molding platform, an inkjet print head, a radiation source, and a heating part, wherein:

the powder supply part is configured to form the powder particle layer on the molding platform;

the inkjet print head is configured to spray the photocurable material onto the powder particle layer according to the layer printing data;

the radiation source is configured to irradiate and cure the photocurable material to form the slice layer;

the heating part is configured to heat the three-dimensional object green body to thermally polymerize the thermosetting powder particles so as to obtain the three-dimensional object.

18. The three-dimensional object molding device according to claim 17, wherein the three-dimensional object molding device further comprises a leveling part, and the leveling part is configured to level the photocurable material on the powder particle layer.

19. The three-dimensional object molding device according to claim 17, wherein the three-dimensional object molding device further comprises a control part, and the control part is configured to control an operation of at least one of the powder supply part, the inkjet print head, the radiation source, and the heating part.

* * * * *